United States Patent [19]
Cobb

[11] Patent Number: 5,207,405
[45] Date of Patent: May 4, 1993

[54] TELEVISION STAND

[76] Inventor: Richard J. Cobb, 108 Ridge Oak Dr., Red Oak, Tex. 75154

[21] Appl. No.: 737,060

[22] Filed: Jul. 29, 1991

[51] Int. Cl.$^5$ ............................................. F16M 11/00
[52] U.S. Cl. ..................................... 248/411; 108/49; 248/124
[58] Field of Search ............... 248/411, 124, 125, 448, 248/917, 132, 121, 122, 670; 108/49, 144, 102; 5/508, 503

[56] References Cited

U.S. PATENT DOCUMENTS

| | | | |
|---|---|---|---|
| 493,605 | 3/1893 | Tiffany | 108/49 UX |
| 2,104,072 | 1/1938 | Carr. | |
| 2,236,133 | 3/1941 | Croninger et al. | |
| 2,795,388 | 6/1957 | Myers | 248/122 |
| 2,986,366 | 5/1961 | Wesson. | |
| 3,229,940 | 1/1966 | Kagels | 248/124 |
| 3,415,475 | 12/1968 | Goodwan | 248/188.1 X |
| 3,680,158 | 8/1972 | Speed | 108/49 X |
| 3,889,910 | 6/1975 | Walters | 248/122 |
| 3,934,806 | 1/1976 | Rady. | |
| 4,165,856 | 8/1979 | Wiseheart. | |
| 4,410,158 | 10/1983 | Maffei. | |
| 4,512,543 | 4/1985 | Petrick | 248/670 |
| 4,520,981 | 6/1985 | Harrigan. | |
| 4,780,919 | 11/1988 | Harrison. | |
| 4,807,836 | 2/1989 | Price et al. | |
| 4,848,710 | 7/1989 | Newman. | |
| 4,946,048 | 8/1990 | Francois. | |

*Primary Examiner*—Ramon O. Ramirez
*Attorney, Agent, or Firm*—Michael A. O'Neil

[57] ABSTRACT

A TV stand is provided for supporting various sized TV sets at the optimal angle for viewing while lying in a bed, for supporting the TV at the optimal the height, for concealing the wiring of the set, and for minimizing the floor space occupied by the stand.

9 Claims, 2 Drawing Sheets

TELEVISION STAND

TECHNICAL FIELD

The present invention relates to a support and, in particular, a stand for supporting a TV set for viewing while lying in a bed.

BACKGROUND OF THE INVENTION

In this day of the "boob tube", everyone wants to watch TV everywhere; in the kitchen, in automobiles, in bars, and, most definitely, in bed. In most instances, bed time TV watchers place the TV on a nearby dresser, a table, or some other flat surfaced piece of furniture, resulting in less than optimal viewing angle and distance from the viewer. In the event the TV set is not remote controlled, the viewer must get out of the bed to change the channel, the volume, or otherwise adjust the set. Where the set is a console or is placed on a conventional TV stand the viewing angle is less than comfortable and a substantial amount of floor space is required. The present invention overcomes these and other problems and inconveniences associated with viewing a TV from a bed by positioning the TV at the optimal angle and the optimal distance from the viewer, with little obstruction of floor space.

SUMMARY OF THE INVENTION

To overcome the problems and inconveniences associated with viewing a TV while in bed, the TV stand of the present invention includes a base positionable under the bed or, in a second embodiment, for attachment directly to the frame of the bed to avoid clutter and obstruction of the floor space in the room. A shaft extends from the base and supports a receptacle or tray on which the TV rests. To accommodate various sizes of TV sets, the tray is width adjustable and is attached to the shaft such that the tray extends outward and downwardly at an angle of about 22½°, which has been determined as the optimal angle for viewing of a TV from a bed.

Although a fixed shaft of a predetermined height may be used, in the preferred embodiment, the shaft of the stand is adjustable to various heights to achieve maximum viewing comfort. Openings in the adjustable shaft allow for concealment of wiring within the shaft.

The design of the base, allowing the base to be positioned under the foot of the bed or attached directly to the bed frame, increases the proximity of the set to the viewer so that the viewer never has to leave the bed to adjust the set. Thus, the TV stand of the present invention supports the TV at the optimal viewing angle, may be adjustable to the optimal viewing level, is adjustable for supporting various sized sets, aesthetically conceals unattractive wiring, and limits obstruction of floor space, making TV viewing from a bed comfortable, convenient and aesthetically pleasing.

BRIEF DESCRIPTION OF THE DRAWINGS

For a more complete understanding of the present invention and the advantages thereof, reference is now made to the following Detailed Description taken in conjunction with the accompanying Drawings in which.

DETAILED DESCRIPTION

Figure 1:
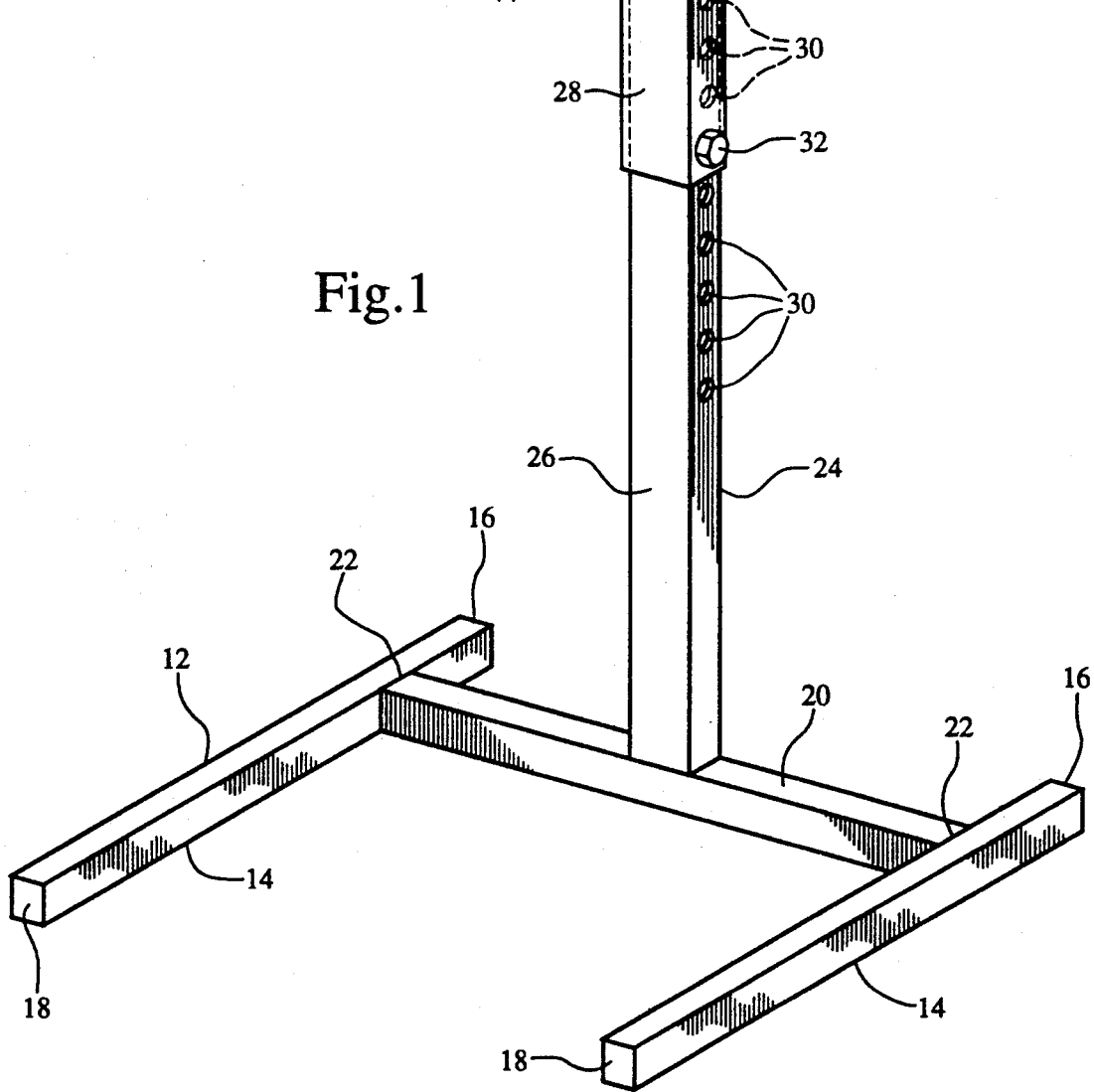
FIG. 1 is an isometric drawing of a TV stand incorporating a first embodiment of the present invention.

As shown in FIG. 1, a TV stand 10 incorporating a first embodiment of the present invention includes a base 12 having two parallel longitudinally extending legs 14 having first ends 16 and second ends 18. A crossbar 20 extends perpendicular to and between the legs 14 and is attached to the legs 14 at a point 22 near the first end 16 of the legs 14 to form the generally "H" shape of the base 12. The crossbar 20 may be attached to the legs 14 through any conventional method of attachment, such as bolting and welding.

A support shaft 24 is attached to the crossbar 20 at a point on the crossbar 20 midway between the legs 14. Although the support shaft 24 may consist of a single, fixed height member (not shown), in the preferred embodiment as shown in FIG. 1, the shaft 24 consists of a first section 26 and a second section 28 which is slidably positioned over the first section 26. The first section 26 of the support shaft 24 has a plurality of holes 30 extending there through. The second section 2 of the support shaft 24 has a single hole 32 extending there through for adjustable alignment with the holes 30 in the first section 26 of the shaft 24 for adjusting the height of the stand 10.

Any type of conventional securing device such as a pin or bolt may be inserted through the aligned holes 30 and 32 to set the height of the support shaft 24. The method of adjusting the height of the support shaft 24, in addition to the method previously described, may be of any conventional method for adjusting shaft lengths. The shaft 24 and base 12 may be constructed of any conventional pipe or tubing of sufficient strength to support the weight of various sizes of TV sets.

Figure 2:
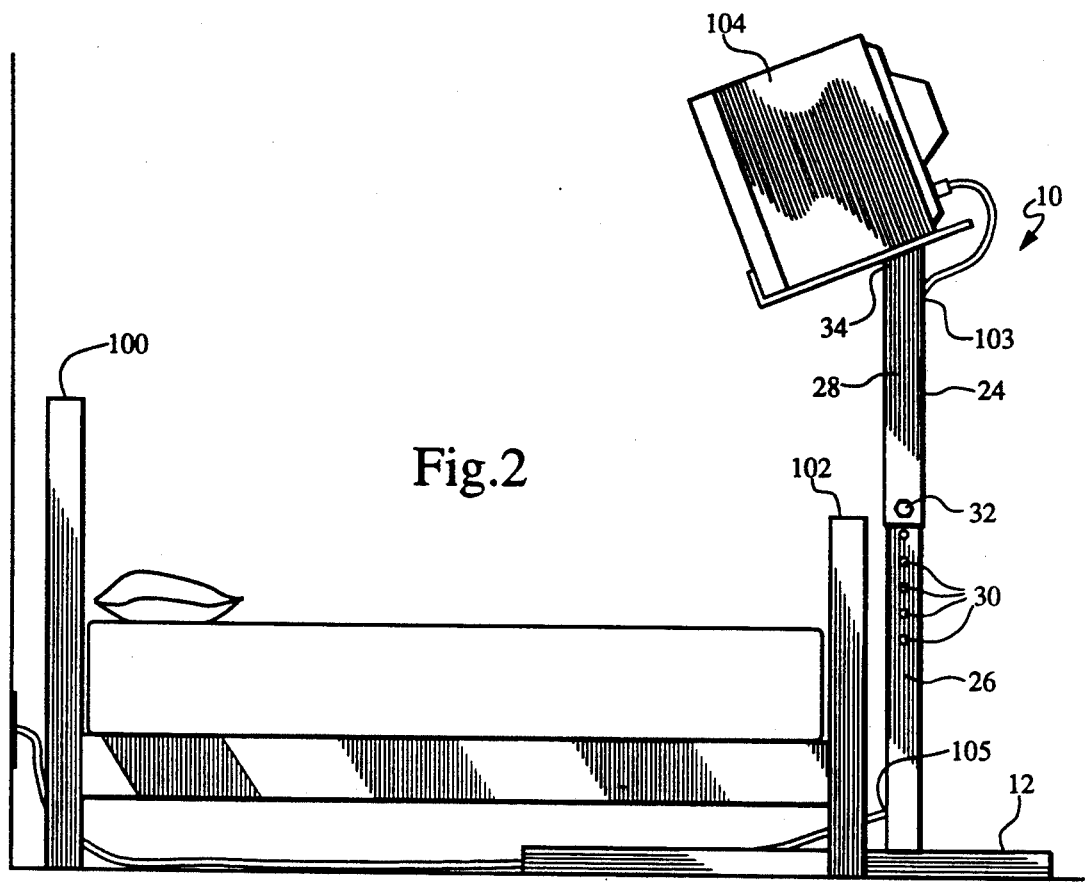
FIG. 2 is a perspective drawing of a bed and the TV stand of FIG. 1.

Referring to FIGS. 1 and 2, attached to the distal end 34 of the support shaft 24 is a receptacle or tray 36 for receiving and supporting a TV thereon. Referring to FIG. 1, the tray 36 includes an underlying plate 38 having a front edge 40, a back edge 42, and two side edges 44. A lip 46 extends along the entire front edge 40 of the underlying plate 38. The support shaft 24 is attached at the distal end 34 to the underlying plate 38 at a point near the back edge 42 midway between the two side edges 44 of the plate 38. The underlying plate 38 is attached to the support shaft 24 at a downward angle of approximately 22½° and extends outwardly and downwardly from the support shaft 24 over the legs 14 nearer the second end 18 of the legs.

Mounted on top of the underlying plate 38 of the tray 36 are two adjustable plates 48 for receiving and supporting a TV set. Each of the adjustable plates has a back edge 50, a front edge 52 and two side edges 54. As with the underlying plate 38, a lip 56 extends across the entire length of the front edge 52 of each of the two adjustable plates 48.

Slots 58 extend through the two adjustable plates 48 and the underlying plate 38 for positional alignment o the adjustable plates 48 over the underlying plate 38. Tightening apparatus 60 which may be any type of conventional tightening apparatus such as a nut and bolt combination or a pin, is inserted into each slot 58 for securing the two adjustable plates 48 in position over the underlying plate 38. Thus, the adjustable plates 48 are slidably positionable to increase or decrease the width of the tray 36. Grip slots 62 are formed in the adjustable plates 48 near the outer most side edges 54 of the adjustable plates 48 for gripping the adjustable plates to slide them over the underlying plate 38 when adjusting the width of the tray 36. Conventional materials such as sheet metal and plastic of sufficient strength to support the weight of various sizes of TV sets may be used in constructing the tray 36.

As shown in FIG. 2, the first ends 18 of the legs 14 of base 12 of the TV stand 10 are placed under a bed 100 near the foot 102 thereof. A TV 104 is then placed onto the tray 36. Wiring for providing power and cable services to the TV are inserted through an opening 103 in the second section 28 of the support shaft 24 and extend down through the support shaft 24 to exit at an opening 105 in the first section 26 of the support shaft 24. Thus, the TV 104 rests above the bed 100 at the optimal angle for viewing while laying in the bed, the wiring is concealed within the support shaft 24 providing for a more aesthetic setting, and the base 12 of the stand 10 is, for the most part, located under the bed 100 to limit the floor space occupied by the stand, and the surface area of the surrounding furniture is available for other uses.

Figure 3:
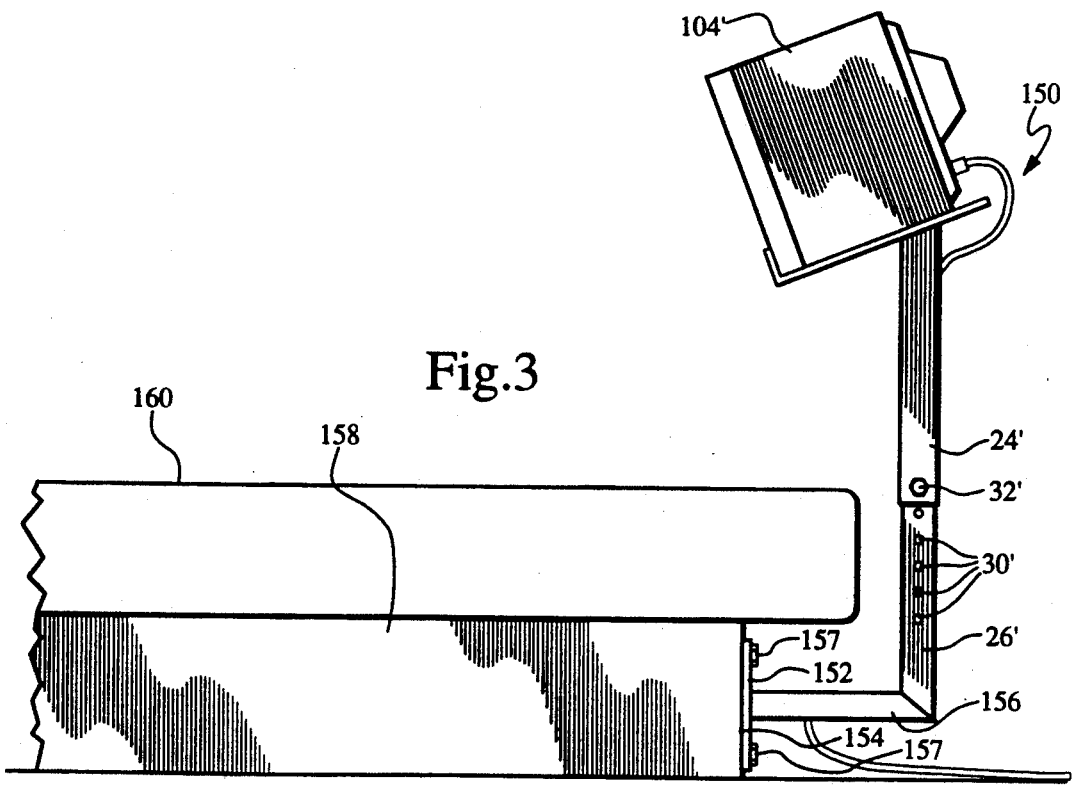
FIG. 3 is a perspective drawing of a TV stand incorporating a second embodiment of the present invention mounted directly to a bed.

As shown in FIG. 3, a TV stand 150 incorporating a second embodiment of the present invention may be attached directly to the frame 158 of a bed 160, especially a waterbed. Portions of the TV stand 150 are similar to the TV stand 10, therefore the same reference numbers will be used as used previously in describing the stand 10 with the addition of the """" designation to distinguish the reference numbers in the second embodiment. The TV stand 150 is identical to the TV stand 10 with the exception that the base 152 of the stand 150 consists of a vertically extending plate 154 mounted to a horizontally extending attachment bar 156 in turn connected to the lower end of the first section 26' of the support shaft 24'. Any conventional attachment apparatus 157 such as screws, bolts, or nails may be used to fixedly attached the plate 154 to the frame 158 of the bed 160. As with the TV stand 10, the shaft 24' may consist of a single member of a predetermined height. Thus, the TV stand 150 supports a TV 104', at the optimal angle for viewing while lying in a bed, aesthetically conceals the wiring within the support shaft 24', and, in addition, completely alleviates any floor space obstruction.

Although the invention has been described and illustrated in detail, it is to be understood that the same is by way of illustration and example only and is not to be taken by way of limitation. The spirit and scope of this invention are to be limited only by the terms of the appended claims.

I claim:

1. Support for receiving and supporting a TV comprising:
   a base;
   a vertically extending shaft attached to said base;
   a tray attached to said shaft for receiving and supporting a TV and having three flat plates with each having a front, a back and two side edges with a lip extending along the front edge of all three plates with two of the plates slidably connected to and supported on the third plate with the side edges of the two plates extending parallel to one another over the third plate and with said shaft of the said support apparatus attached to said tray at a center point on the back edge of the third plate; and
   means for adjusting the width of said tray to accommodate various size TV sets.

2. The support apparatus of claim 1 wherein the tray is fixedly attached to the shaft and extends outwardly and downwardly therefrom at an angle of about twenty-two and one half degrees.

3. Support for receiving and supporting a TV comprising
   a base;
   a vertically extending shaft attached to said base;
   a tray attached to said shaft for receiving and supporting a TV;
   openings in said shaft for entry and exit of TV wiring for concealment of the wiring in said shaft; and
   means for adjusting the width of said to tray to accommodate various size TV sets.

4. A stand for supporting a TV for viewing while lying in bed comprising:
   a base;
   a vertically extending shaft having first and second ends and attached at the first end to said base;
   openings in the first and second ends of said shaft for the entry and exit of TV wiring for concealment of the wiring within said shaft;
   means for adjusting the length of said shaft;
   a support receptacle attached to extend outwardly and angularly downwardly from the second end of said shaft for receiving and supporting a TV; and
   means for adjusting the width of said support receptacle to accommodate various size TVs.

5. The TV stand of claim 4 wherein said support receptacle extends outwardly and angularly downwardly from said shaft over the second ends of the legs of said base.

6. The TV stand of claim 4 wherein said base comprises a vertically extending plate for fixedly attaching said stand directly to a bed.

7. The TV stand of claim 4 wherein said support receptacle comprises three flat plates with each having a front, a back and two side edges with a lip extending along the front edge of all three plates and two of the plates being slidably connected to and supported on the third plate with the side edges of the two plates extending parallel to one another over the underlying third plate and with said shaft of said stand attached to the support receptacle at a center point on the back edge of the underlying third plate.

8. The TV stand of claim 4 wherein said support receptacle is fixedly attached to said shaft at an angle of about twenty-two and one half degrees.

9. A TV support for supporting a TV for viewing while lying in bed comprising:
   a base;
   a vertically extending shaft having first and second ends and attached at the first end to the center of the cross bar of said base;
   means for adjusting the length of said shaft;
   openings in the first an second ends of said shaft for the entry and exit of TV wiring for concealment of the wiring within said shaft;
   a support receptacle comprising three flat plates with each having a front, a back and two side edges with a lip extending along the front edge of all three plates and two of the plates being slidably connected to and supported on the third plate with the side edges of the two plates extending parallel to one another over the underlying third plate and with said shaft of said support apparatus attached to said support receptacle at a center point on the back edge of the underlying third plate;

said support receptacle fixedly attached to said shaft at an angle of about twenty-two and one half degrees to extend outwardly and angularly downwardly from the second end of said shaft for receiving and supporting a TV; and means for adjusting the width of said support receptacle to accommodate various size TVs.

* * * * *